US008103495B2

(12) United States Patent
Veanes et al.

(10) Patent No.: US 8,103,495 B2
(45) Date of Patent: Jan. 24, 2012

(54) FEATURE ORIENTED PROTOCOL MODELING

(75) Inventors: Margus Veanes, Bellevue, WA (US); Colin Campbell, Seattle, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1203 days.

(21) Appl. No.: 11/835,853

(22) Filed: Aug. 8, 2007

(65) Prior Publication Data

US 2009/0043560 A1    Feb. 12, 2009

(51) Int. Cl.
*G06F 9/45* (2006.01)

(52) U.S. Cl. ........... 703/22; 709/230; 717/104; 717/114

(58) Field of Classification Search ............... 703/22, 703/2; 717/104, 114, 107, 140, 165; 709/230
See application file for complete search history.

(56) References Cited

U.S. PATENT DOCUMENTS

| | | | |
|---|---|---|---|
| 6,467,086 B1 | 10/2002 | Kiczales et al. | |
| 6,539,390 B1 | 3/2003 | Kiczales et al. | |
| 6,625,804 B1 | 9/2003 | Ringseth et al. | |
| 6,985,762 B2 * | 1/2006 | Brashears et al. | 600/323 |
| 7,047,518 B2 | 5/2006 | Little et al. | |
| 7,130,885 B2 * | 10/2006 | Chandra et al. | 709/206 |
| 7,140,007 B2 | 11/2006 | Lamping | |
| 7,143,019 B2 * | 11/2006 | Gabele et al. | 703/13 |
| 7,359,847 B2 * | 4/2008 | Gabele et al. | 703/17 |
| 7,392,169 B2 * | 6/2008 | Gabele et al. | 703/13 |
| 7,581,170 B2 * | 8/2009 | Baumgartner et al. | 715/234 |
| 7,752,613 B2 * | 7/2010 | Guo et al. | 717/153 |
| 2002/0138582 A1 * | 9/2002 | Chandra et al. | 709/206 |
| 2005/0071806 A1 | 3/2005 | Sreedhar | |
| 2007/0074182 A1 | 3/2007 | Hinchey et al. | |
| 2007/0168927 A1 | 7/2007 | Campbell et al. | |
| 2007/0286393 A1 * | 12/2007 | Roever et al. | 379/221.1 |

FOREIGN PATENT DOCUMENTS

WO    WO2007001108    1/2007

OTHER PUBLICATIONS

Veanes, Margus, et al, "Composition of Model Programs", Forte 2007, vol. 4574 series LNCS, Springer Publishing, 2007, pp. 128-142.
Veanes, Margus, et al. "Protocol Modeling with Model Program Composition", MSR Technical Report: MSR-TR-2008-33, Feb. 2008, 17 pages.
Sochos, et al., "Feature-Oriented Development of Software Product Lines: Mapping Feature Models to the Architecture", Lecture Notes in Computer Science vol. 3263/2004, 2004.
Cottenier, et al., "Stateful Aspects: The Case for Aspect-Oriented Modeling", 2007 ACM.
Philippow, et al., "The Hyper/UML Approach for Feature Based Software Design", The 4th AOSD Modeling With UML Workshop, 2003.

* cited by examiner

*Primary Examiner* — Russell Frejd
(74) *Attorney, Agent, or Firm* — Workman Nydegger

(57) ABSTRACT

Modeling protocols. A method includes accessing a number of model programs. Each model program includes computer-executable instructions. The computer-executable instructions describe the behavior of at least one of another program, system, or component. Model programs may be disjointed in that they have independent meaning or dependent in that they include at least one of a state variable, action, or precondition that is dependent on another model program to impart meaning to the model program. An output model program is composed by unification including substituting state variables into another of the model programs without executing the model programs. Traces are generated from the output model program. Each of the traces includes a path of labels. The labels describe actions of the output model program from an initial state to an accepting state where a run is allowed to stop. The traces are output to a user.

19 Claims, 2 Drawing Sheets

FEATURE ORIENTED PROTOCOL MODELING

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the patent and trademark office patent file or records, but otherwise reserves all copyright rights whatsoever.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. Additionally, systems within a computer may communicate on internal busses. The connections allow a computing system to access services at other computing systems and to quickly and efficiently receive application data from other computing system.

To interconnect computer systems, typically the computer systems operate using protocols Designing and interoperability testing of distributed, application level network protocols is complex. Protocol complexities range from simple protocols for email exchange to complex protocols for distributed file replication or real time communication.

One can think of the reasons for the complexity arising in two orthogonal dimensions. In the horizontal dimension, a protocol typically has multiple layers and depends on or uses other protocols. In a good protocol design, internal details of the underlying protocols should not leak out and the layering principle should be maintained.

In the vertical dimension a protocol typically includes many different features. In this respect, a feature is an increment of functionality of the overall functionality of the protocol with a coherent purpose. Usually features interact and together define the protocol as a whole. For instance, in traditional natural language specification of client-server protocols the client side of the feature is typically separately described from the server side of the same feature. Both descriptions together imply a set of valid behaviors, in terms of what information must be present in messages or what constraints are applied to message traces that are communicated between the server and the client, so that the feature is correctly implemented on both sides The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method of modeling protocols. The method may be practiced, in a computing environment. The method includes accessing a number of model programs. Each model program includes computer-executable instructions. The computer-executable instructions describe the behavior of at least one of another program, system, or component. At least two of the model programs are disjointed in that they have independent meaning. An output model program is composed by unification including substituting state variables from one of the disjointed model programs into another of the disjointed model programs without executing the model programs. Traces are generated from the output model program. Each of the traces includes a path of labels. The labels describe actions of the output model program from an initial state to an accepting state where a run is allowed to stop. The traces are output to a user.

Another embodiment disclosed herein includes an alternate method of modeling protocols. The method includes accessing a number of model programs, wherein each model program includes computer-executable instructions. The computer-executable instructions describe the behavior of at least one of another program, system, or component. At least one of the model programs is a feature model program defining at least one of state variables, actions, or preconditions that may optionally be included in an output model program. The feature model program includes at least one of a state variable, action, or precondition that is dependent on another model program to impart meaning to the feature model program. An output model program is composed by unification without executing the plurality of model programs. Traces are generated from the output model program. Each of the traces includes a path of labels. The labels describe actions of the output model program from an initial state to an accepting state where a run is allowed to stop. The traces are output to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
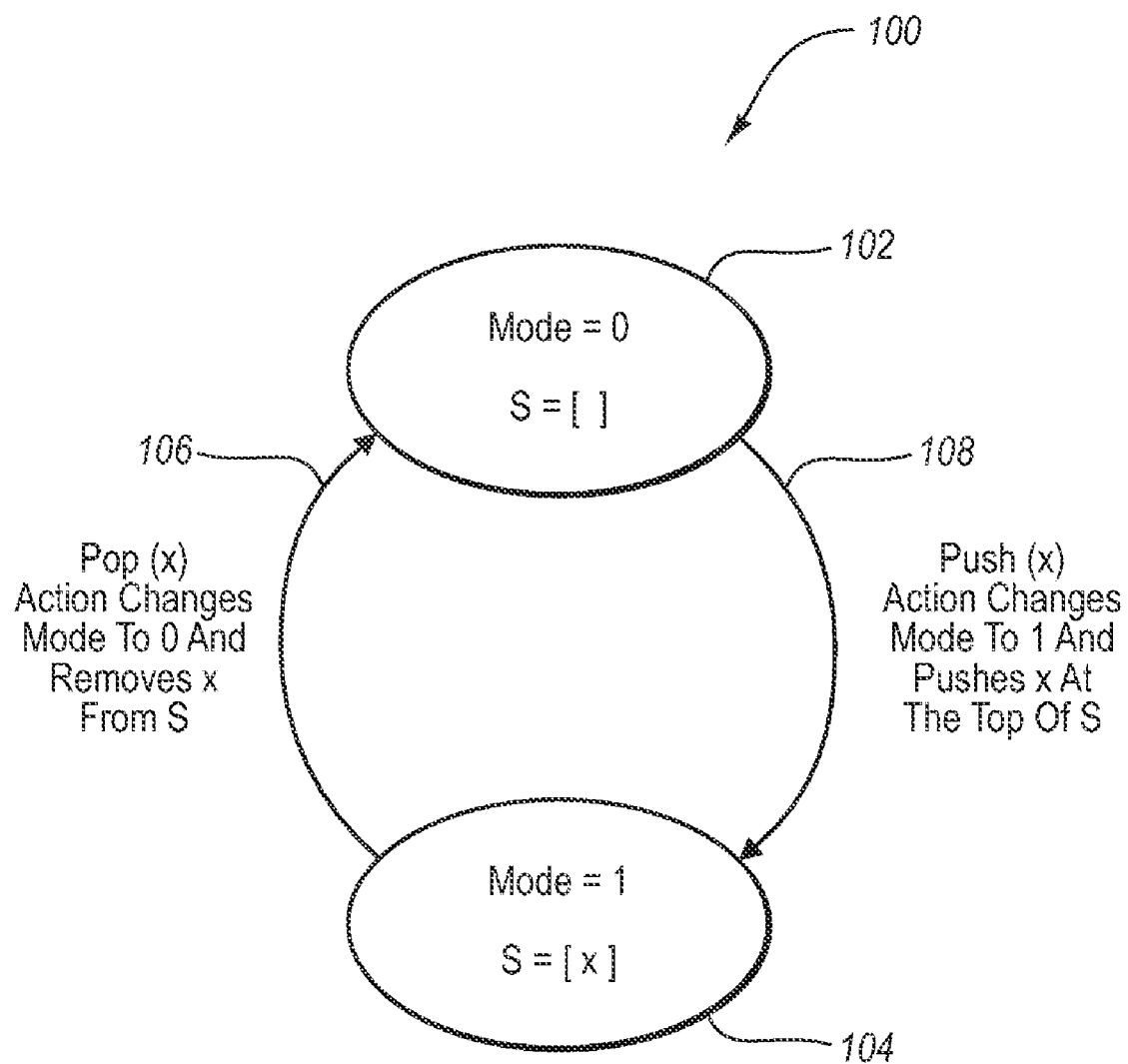
FIG. 1 illustrates a finite state machine drawing.

Embodiments herein may comprise a special purpose or general-purpose computer including various computer hardware, as discussed in greater detail below.

Some embodiments described herein include functionality for modeling features of protocols as model programs. Different features can be combined by composition to compose an output model program where the output model program is used to model a complete or partial protocol. Traces can then be generated from the output model program. The traces can be used to at least partially describe a finite state machine where the finite state machine models the complete or partial protocol. In particular, the traces include a path of labels where the labels describe actions of the output model program from an initial state to an accepting state. The states may be identified by state variables. To facilitate a better understanding of the embodiments described herein, certain terminology will now be explained.

A state here is a full first-order state that is intuitively a mapping from a fixed set of state variables to a fixed universe of values. States also have a rich background that contains sequences, sets, maps, sets of sets, maps of sets of maps, etc. It is assumed here that all state variables are nullary. A value term is a term that does not contain any state variables. A ground term is a term that does not contain any free (logic) variables. Thus, a ground value term has the same interpretation in all states and represents a concrete value.

Because states have a rich background universe they are infinite. However, for representation, interest is directed to the foreground part of a state that is the interpretation of the state variables. Model programs typically also have user-defined types that are part of the background.

An update rule is a collection of (possibly conditional) assignments to state variables. An update rule p that has formal input parameters $\bar{x}$ is denoted by $p[\bar{x}]$. The instantiation of $p[\bar{x}]$ with concrete input values $\bar{v}$ of appropriate type, is denoted by $p[\bar{v}]$. An update rule p denotes a function $[[p]]$: States×Values"→States A formula that does not contain any state variables is state independent. A formula is closed if it contains no free logic variables. A closed formula $\phi$ has the standard truth interpretation $s|=\phi$ in a state s. Note that a closed state independent formula is either true or false, independent of state.

A guard $\phi$ is a formula that may contain free logic variables $\bar{x}=x_1, \ldots, x_n$, denoted by $\phi[\bar{x}]$. Given values $\bar{v}=v_1 \ldots, v_n$ it is written $\phi[\bar{v}]$ for the replacement of $x_i$ in $\phi$ by $v_i$ for $1 \leq i \leq n$.

A guarded update rule is a pair $(\phi,p)$ containing a guard $\phi[\bar{x}]$ and an update rule $p[\bar{x}]$; intuitively $(\phi,p)$ limits the execution of p to those states and arguments $\bar{v}$ where $\phi[\bar{v}]$ holds.

An f-pattern is a term $f(x_1, \ldots, x_n)$ where f is a function symbol of arity n and each $x_i$ is a logic variable. An action rule for f or f-action rule is a triple $((t, \phi, p))$ where t is an f-pattern and $((\phi,p))$ is a guarded update rule whose free logic variables are contained in t. Distinct variables it t that do not occur in $((\phi,p))$ are called wildcards or placeholders and may be denoted by '_'.

A feature is an increment of protocol functionality with a coherent purpose. A model program describing a feature describes the behavior of another program, system, or component. Features can be understood, modeled and analyzed separately. The overall behavior of a protocol can then be defined by feature composition, which defines how the individual features interact with one another. In one embodiment, one feature may model server actions and/or constraints while a different feature models client actions and/or constraints. The features are not limited to server/client relationships, but may also be used in other sender receiver relationships, including peer communication, service communication, or other types of communication.

Generally, the features are modeled as model programs where the model programs ideally describe very basic features. In other words, rather than trying to combine various aspects of a protocol immediately into a single model program, features are modeled in a number of model programs. The features can later be used to compose an output model program to model all or part of a protocol. Modeling features in separate model programs allows features to be evaluated and tested independent of an entire protocol.

Each of the feature model programs may be validated through exploration. For a model program to be explorable, all action parameters should have finite domains. When a feature has an infinite domain, the feature may be validated by defining through composition a new model program that restricts the parameter domains.

Validation may be used to ensure that no unsafe states are reached. Unsafe states are those that are reachable through a series of actions from the initial state that violate the state invariant.

The NModel toolkit space exploration utility called mpv (model program viewer) available from Microsoft Corporation of Redmond Wash. can be used for incremental exploration and validation of model programs.

Model programs can describe disjointed features or dependent features. Disjointed features modeled in model programs have independent meaning. In other words, a feature, and corresponding first model program can be instantiated independent of another model program, which may also be instantiated independent of the first model program.

Model programs describing dependent features include one or more of a state variable, action, or precondition that is dependent on another model programs to impart meaning to a feature model program. In some embodiments, a model program may be dependent when it has no state variables of its own, but refers to state variables of other features.

The model programs are generally written using machine readable code. For example, in one embodiment, a feature may be described by a model program written using C# or another appropriate machine readable code. Machine readable code is distinguished from other types of code. Machine readable code is code complying with requirements of a particular programming language. In particular, while it is understood that ordinary text can be read by a scanner, converted to text through optical character recognition, and otherwise manipulated, this ordinary text is not machine readable code as contemplated herein if it does not comply with the requirements of a programming language.

An output model program P has the following components:
A finite state vocabulary Y of state variables.
A finite action vocabulary $\Sigma$ of action symbols that have term interpretation.
An initial state condition $\phi^{ini}$ assigning values to all y∈Y.
An accepting state condition $\phi^{acc}$.
An action rule $A[f]=(a^f, \phi^f, p^f)$ for all f∈$\Sigma$ Input model programs and features may omit the finite state vocabulary, the initial state condition, and the accepting state condition.

An initial state is the state where a run begins. An accepting state is a state where a run is allowed to stop. Usually, accepting states are chosen where some goal has been reached or some work has been completed. An accepting state condition is a predicate that defines accepting states.

An action is the smallest unit of behavior at a chosen level of abstraction. An action may be a discrete, discontinuous, atomic execution step. Executing an action causes a state transition. An action has the form $f(v_1, \ldots, v_n)$ where f is an n-ary action symbol and each $v_1$, is a value. An action $f[\bar{v}]$ is enabled in a state s if $s|=\phi^f[\bar{v}]$. An action $f[\bar{v}]$ that is enabled in a state s can be executed or invoked in s and yields the state $[[p^f]](s[\bar{v}])$.

Model programs, including an input model program modeling a feature or an output model program modeling a composition of features, may be unwound. Unwinding of a model program P from its initial state gives rise to as a labeled transition system (LTS) denoted by $[[P]]$. The LTS has the initial state of P as its initial state. There is a transition $(s_1, a, s_2)$ in $[[P]]$ provided that $s_1$ is reachable from the initial state and a is an action such that the invocation of a in $s_1$ yields the state $s_2$.

A trace of an LTS M is a sequence of actions $(a_i)_{i<k}$, such that there is a sequence of transitions $(s_i, a_i, s_{i+1})_{i<k}$ in M where $s_0$ is the initial state. The set of all traces of M is denoted by Traces(M).

Two or more model programs describing features can be composed into an output model program. Composition is performed without actually executing the model program to accomplish the composition. However, composition is typically performed once individual features have been modeled and validated in isolation. Under composition, output model programs will synchronize steps for shared actions and interleave actions not found in a common action vocabulary. When actions are synchronized, values are shared through unification and may transfer data from one model program to another. Some or all of the features can be composed to compose a partial output model, or a full output model.

The guards of the actions in the composition of an output model program are the conjunctions of the guards of the component model programs. The update rules are the parallel composition of the update rules of the component model programs. Composition is well-defined only if the composed model programs do not both write to shared state variables. The accepting state condition under composition is the conjunction of the accepting state conditions of the component model programs.

Two model programs are feature composable if they do not both update same shared state variables. Two model programs are compatible if they have the same action vocabulary. Given two action rules for f $A_1=(a_1, \psi_1, p_1)$ and $A_2=(a_2, \psi_2, p_2)$, for $(A_1*A_2)$ for the composed action rule is $(a_1\theta, \psi_1\theta^\wedge\psi_2\theta, p_1\theta\cup p_2\theta)$, where $\theta$ is a unifier of $a_1$ and $a_2$.

The composition of P and Q, denoted by P*Q is a model program with the following components.•

$$Y_{P*Q}=Y_P\cup Y_Q$$

$$\Sigma_{P*Q}=\Sigma_P=\Sigma_Q$$

$$\phi_{P*Q}^{ini}=\phi_P^{ini\wedge}\phi_Q^{ini}$$

$$\phi_{P*Q}^{acc}=\phi_P^{acc\wedge}\phi_Q^{acc}$$

For all $$f\epsilon\Sigma_{P*Q}, A_{P*Q}[f]=A_P[f]*A_Q[f]$$

Let P be a model program and f an action symbol not in $\Sigma_P$. The loop extension of P for f, denoted by $P^f$, is the extension of P such that $\Sigma_{Pf}=\Sigma_P\cup\{f\}$ and $P^f$ has a guarded update rule for f whose guard is true and whose update rule is empty. The loop extension of P for a set of action symbols F is denoted by $P^F$.

It is convenient to extend the definition of composition to any two feature composable model programs P and Q by using their loop extensions:

$$P*Q^{def}=P^{\Sigma_Q\backslash\Sigma_P}*Q^{\Sigma_P\backslash\Sigma_Q}$$

When composition is used in an unrestricted manner the end result is a new model program, which from the point of view of trace semantics might be unrelated to the original model programs. Essentially, this happens if two model programs can read each others state variables. Two model programs are variable disjoint if they have no common state variables. Two model programs are fully composable if they are feature composable, compatible and variable disjoint. The following proposition follows from the above.

If P and Q are fully composable model programs, then Traces($[[P*Q]]$)=Traces($[[P]]$)∩Traces($[[Q]]$). The main reason why this property is important is that it makes it possible to do compositional reasoning over the traces in the following sense. If all traces of P satisfy a property p and all traces of Q satisfy a property q then all traces of P*Q satisfy both properties p and q.

For scenario control, it is sometimes useful to refer to the state variables of a feature of a model program in order to write a scenario for it. In other words, there is a given model program M with a feature $F_1$ that is the contract and there is a dependent feature $F_2$ of M that may read the state variables of $F_1$ but it may not change the values of those variables. A property that is preserved in this case is that the set of traces of $F_1$ is a superset of the set of traces of $F_1*F_2$. Such use of features is usually safe because no new traces of the contact can arise. Two typical uses of dependent features for scenario control are state-dependent parameter generation and enabling condition strengthening.

Protocol model programs are written to improve documentation and to be used as a basis for conformance testing. In the context of conformance testing one important role of a model program is to be an oracle that can be used to decide whether an implementation works as expected. Another role is to use model programs for test case generation.

A large portion of the effort in model-based conformance testing of protocols is spent in harnessing of the implementation. A big part of this effort goes into defining a mapping from concrete messages on the wire to abstract actions. When defining a mapping from concrete messages on the wire not all of the fields of messages are relevant. For example, some of the fields in a message are solely related to well-formedness of the message structure, checking of which can be part of a message validation layer that is orthogonal to the feature models.

It is instrumental to provide links from the formal model to the corresponding sections or paragraphs in the natural language specification to track those requirements and to keep the natural language parts and the feature model programs in sync.

An example will now be used to illustrate protocol design, feature modeling, and composition of a model program. Suppose a designer wishes to create a stack protocol with the following requirements. All Push and Pop operations must alternate. In other words, a Push, which adds an entry to a stack data structure, must be followed directly by a Pop, which removes an item from the stack data structure, and a Pop must be followed directly by a Push. Further, a Pop may not be performed if the data structure is empty. For purposes of this example, a number of model programs and variables will be defined. The first variable is the variable "mode." Mode specifies if the system is in pushing mode (i.e. mode=0) or popping mode (i.e. mode=1). The alternation of Push and Pop can be specified with a model program M1. M1 has Push and Pop in its action vocabulary. The initial state is mode=0. M1 has the following action rules: (Push(_), mode=0, mode:=1), (Pop(_), mode=1, mode:=0). In other words, Push is enabled when mode is 0 and executing Push yields the state where mode is 1. Similarly, Pop is enabled when mode is 1 and executing Pop yields the state where mode is 1. Notice that M1 says nothing about what Push and Pop actually mean.

The second model program M2 describes the valid behavior of a stack protocol for Push and Pop. It uses a state variable s that is a sequence that represents the models stack data structure. Initially s is empty. Pushing has no preconditions, and as such, pushing may be performed at any time where the update is to Push a data item onto the stack data structure. Thus, the action rule for Push is: (Push(x), true, s:=s.AddFirst (x)) where s.AddFirst(x) adds the data item x at the top of s.

To Pop something from the stack data structure, the stack data structure must not be empty. Thus popping has a precondition that the stack data structure must not be empty and that the first element is popped. In other words, the stack length must be greater than zero and the element that is popped is at the top of the stack. The update rule removes the first element from the stack. The action rule for the Pop action is as follows: (Pop(x), s.Length>0&x=s.First, s:=s.Rest).

M1 and M2 can be combined into an output model program M1*M2 by using the composition principles described above. Composition results in computer readable code modeling an output model program. This output model program can be used to generate a trace, which is a list of actions for labels on a labeled graph such as a finite state machine. A labeled transition system 100 showing the composition of M1*M2 is illustrated in FIG. 1. FIG. 1 illustrates a state 102 where the mode state variable is 0 indicating pushing mode. FIG. 1 further illustrates a state 104 where the mode state variable is 1 indicating popping mode. FIG. 1 further illustrates transitions or edges 106 and 108 describing actions when there is a mode change. The edges can be used to construct traces. For example, a valid trace of M1*M2 is Push(1), Pop(1), Push(3), Pop(3), Push(5), Pop(5). On the other hand, Push(1), Push(2), Pop(2), Pop(1) is a valid trace of M2, but it is not a valid trace of M1*M2. Similarly, Push (1), Pop(2), Push(2), Pop(3) is a valid trace of M1 but not a valid trace of M1*M2.

Notably, other features can be added by composition. For example, another feature may specify that the stack length is no greater than 4. Because the action Push is the only action that can cause the stack length to exceed this constraint, another feature M3 may be modeled using the action rule (Push(_), s.Length≦3, skip) that can be composed with M2 to yield traces such that every prefix of a trace has at most three more push actions that pop actions. Notice that M3 is a dependent feature that refers to the state variable of M2.

Also, composition may be accomplished using model programs that include wild cards. This was done in M3 for example. The following model program M4 is another example that models that the total number of pushes and pops should be at most 6. M4 uses a state variable count to count the total number of pushes and pops. The value of count is initially 0. The action rules for push and pop are (Push(_, count<6, count:=count+1), (Pop(_, count<6, count:=count+ 1). Note that the element being pushed or popped is a wild card.

Figure 2:
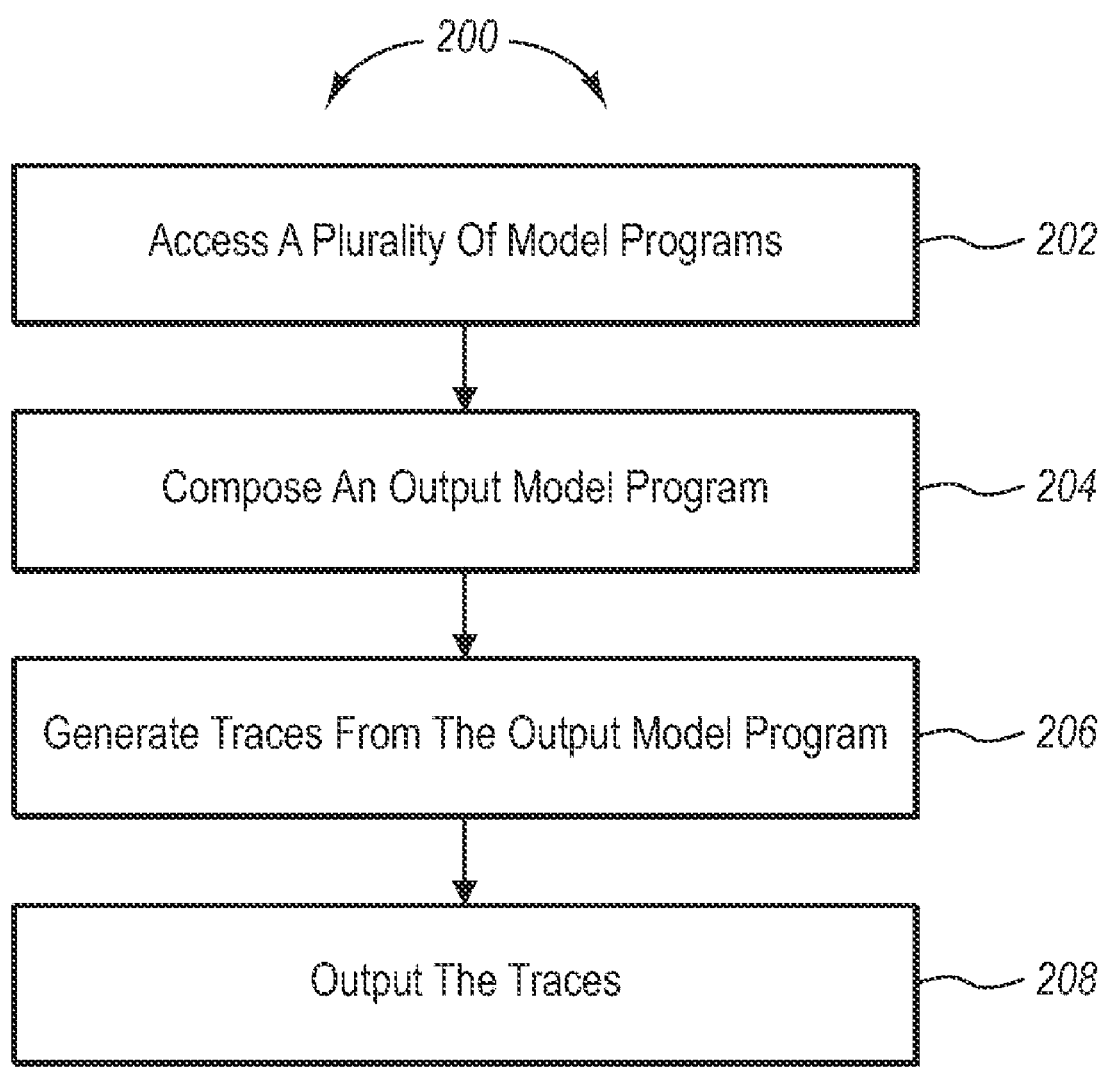
FIG. 2 illustrates a method of analyzing model programs.

Referring now to FIG. 2, a method 200 is illustrated. The method 200 may be practiced, for example, in a computing environment. The method includes acts for modeling protocols. The method includes accessing a plurality of model programs (act 202). Each model program includes computer-executable instructions. The computer-executable instructions describe the behavior of another program, system, or component. In one embodiment, at least two of the model programs are disjointed in that they have independent meaning with respect to one another. In an alternative embodiment, a model program includes at least one of a state variable, action, or precondition that is dependent on another model program to impart meaning to the model program.

Model programs include actions as part of the model program. Model programs may include actions that include wildcards. As explained previously, substitution of values from other model programs may be substituted for the wildcards when model programs are composed.

The method 200 further includes composing an output model program (act 204) by unification without executing the plurality of model programs. Composition and unification are discussed in more detail above.

The method 200 further includes generating traces from the output model program (act 206). Each of the traces includes a path of labels, where the labels described actions of the output model program from an initial state to an accepting state where a run is allowed to stop. For example, the output model program illustrated by the graph of FIG. 1 may have the following trace generated: Push(x1), Pop(x1), Push(x2), Pop(x2), where x1 and x2 represent concrete data elements.

The method 200 further includes outputting the traces (act 208). Outputting the traces may be performed by displaying the traces to a user in video or print form, sending the traces to another process, storing the traces to a computer readable medium, etc.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of modeling protocols, the method comprising:
   accessing a plurality of model programs, wherein each model program comprises computer-executable instructions, the computer-executable instructions describing the behavior of at least one of another program, system, or component; wherein at least two of the model programs are disjointed in that the at least two of the model programs have independent meaning, wherein the at least two of the model programs do not share preconditions, each precondition causing a corresponding action to be enabled when the precondition is true, and wherein the at least two of the model programs do not share state variables storing the state of a model program;
   composing an output model program by unification including substituting state variables from one of the disjointed model programs into another of the disjointed model programs without executing the plurality of model programs;
   generating traces from the output model program, wherein each of the traces comprises a path of labels, wherein the labels describe actions of the output model program from an initial state to an accepting state where a run is allowed to stop; and
   outputting the traces.

2. The method of claim 1, wherein the at least one of the disjointed model programs comprises actions that comprise wildcards.

3. The method of claim 1, wherein generating traces from the output model program comprises performing an exploration of the output model program.

4. The method of claim 1, wherein at least one of the disjointed model programs comprises server actions, and at least one of the disjointed model programs comprises client actions.

5. The method of claim 1, wherein the at least one of the disjointed model programs comprises sender actions, and at least one of the disjointed model programs comprises receiver actions.

6. The method of claim 1, wherein composing an output model program is performed once one or more of the plurality of model programs have been modeled and validated in isolation.

7. In a computing environment, a method of modeling protocols, the method comprising:
   accessing a plurality of model programs, wherein each model program comprises computer-executable instructions, the computer-executable instructions describing the behavior of at least one of another program, system, or component, wherein at least one of the model programs is a feature model program defining at least one of state variables, actions, or preconditions that may optionally be included in an output model program, wherein the feature model program comprises at least one of a state variable, action, or precondition that is dependent on another model program to impart meaning to the feature model program;
   composing an output model program by unification without executing the plurality of model programs;
   generating traces from the output model program, wherein each of the traces comprises a path of labels, wherein the labels describe actions of the output model program from an initial state to an accepting state where a run is allowed to stop; and
   outputting the traces.

8. The method of claim 7, wherein the at least one of the model programs comprises actions that comprise wildcards.

9. The method of claim 7, wherein generating traces from the output model program comprises performing an exploration of the output model program.

10. The method of claim 7, wherein at least one of the model programs comprises server actions, and at least one of the model programs comprises client actions.

11. The method of claim 7, wherein at least one of the model programs comprises sender actions, and at least one of the model programs comprises receiver actions.

12. The method of claim 7, wherein at least two of the model programs do not share preconditions, wherein the preconditions cause an action to be enabled when the precondition is true, and at least two of the model programs do not share state variables storing the state of a model program.

13. The method of claim 7, wherein composing an output model program is performed once one or more of the plurality of model programs have been modeled and validated in isolation.

14. In a computing environment, a computer readable storage medium comprising computer executable instructions that when executed by a processor cause the following act to be performed:
    accessing a plurality of model programs, wherein each model program comprises computer-executable instructions, the computer-executable instructions describing the behavior of at least one of another program, system, or component; wherein at least two of the model programs are disjointed in that the at least two of the model programs have independent meaning, and wherein the at least two of the model programs fail to share preconditions that cause an action to be enabled when the preconditions are true;
    composing an output model program by unification including substituting state variables from one of the disjointed model programs into another of the disjointed model programs without executing the plurality of model programs;
    generating traces from the output model program, wherein each of the traces comprises a path of labels, wherein the labels describe actions of the output model program from an initial state to an accepting state where a run is allowed to stop; and
    outputting the traces.

15. The computer readable storage medium of claim 14, wherein the at least one of the disjointed model programs comprises actions that comprise wildcards.

16. The computer readable storage medium of claim 14, wherein generating traces from the output model program comprises performing an exploration of the output model program.

17. The computer readable storage medium of claim 14, wherein at least one of the disjointed model programs comprises server actions, and at least one of the disjointed model programs comprises client actions.

18. The computer readable storage medium of claim 14, wherein the at least one of the disjointed model programs comprises sender actions, and at least one of the disjointed model programs comprises receiver actions.

19. The computer readable storage medium of claim 14, wherein at least two of the model programs do not share preconditions, wherein the preconditions cause an action to be enabled when the precondition is true, and the at least two of the model programs do not share state variables storing the state of a model program.

* * * * *